United States Patent
Tutino

(10) Patent No.: US 11,359,376 B2
(45) Date of Patent: Jun. 14, 2022

(54) THREADED ROD COUPLING WITH MAIN RECEPTACLE AND ONE OR MORE RECEPTACLES EXTENDING THEREFROM AT AN ANGLE

(71) Applicant: John C. Tutino, Yardley, PA (US)

(72) Inventor: John C. Tutino, Yardley, PA (US)

(*) Notice: Subject to any disclaimer, the term of this patent is extended or adjusted under 35 U.S.C. 154(b) by 0 days.

(21) Appl. No.: 15/930,201

(22) Filed: May 12, 2020

(65) Prior Publication Data
US 2020/0362562 A1    Nov. 19, 2020

Related U.S. Application Data

(60) Provisional application No. 62/847,795, filed on May 14, 2019.

(51) Int. Cl.
*F16B 37/00*    (2006.01)
*E04C 5/16*    (2006.01)
(Continued)

(52) U.S. Cl.
CPC ............. *E04C 5/165* (2013.01); *E04B 1/40* (2013.01); *E04C 5/167* (2013.01); *F16B 37/00* (2013.01);
(Continued)

(58) Field of Classification Search
CPC .......... E04C 5/165; E04C 5/167; E04C 5/166; E04B 1/40; E04B 9/18; E04B 9/20;
(Continued)

(56) References Cited

U.S. PATENT DOCUMENTS

| 3,424,178 A | * | 1/1969 | Yoshimi | E04H 15/44 135/157 |
| 3,591,211 A | * | 7/1971 | Richey | F16B 7/0493 403/395 |

(Continued)

FOREIGN PATENT DOCUMENTS

| DE | 102012024628 A1 | * | 8/2013 | ............. E04C 5/166 |
| GB | 908930 A | * | 10/1962 | |

(Continued)

OTHER PUBLICATIONS

Translation of DE-102012024628-A1.*

*Primary Examiner* — Adriana Figueroa

(57) ABSTRACT

An angled coupling to receive multiple pieces of threaded rod in order to adjust the location of the threaded rod, that can also be used for seismic restraints and/or storm surge restraints. The angled coupling includes a first internally threaded coupler and a second internally threaded coupler connected to the first coupler and extending from the first coupler at a defined angle from an axis thereof. The angled coupling may include additional couplings extending from the first coupler at the defined angle that may be spaced apart around the axis of the first coupling. The first coupler may (Continued)

be a passthrough coupler to either have a threaded rod pass therethrough or to receive a first threaded rod in a first side and a second threaded rod in a second side. The angled coupling is made of a high strength material (e.g., steel, cast iron, composites, high strength plastics, combinations thereof).

14 Claims, 16 Drawing Sheets

(51) Int. Cl.
    *E04B 1/41*     (2006.01)
    *E04B 1/19*     (2006.01)
    *E04B 9/18*     (2006.01)
    *F16L 41/02*     (2006.01)

(52) U.S. Cl.
    CPC ......... *E04B 9/18* (2013.01); *E04B 2001/1924* (2013.01); *F16L 41/02* (2013.01)

(58) Field of Classification Search
    CPC . E04B 2001/1924; F16L 41/02; F16L 41/023; F16B 7/04; F16B 7/044; F16B 7/0486; F16B 7/0493; F16B 37/00; Y10T 403/5746; Y10T 403/5761; Y10T 403/5766; Y10T 403/5781
    See application file for complete search history.

(56) References Cited

U.S. PATENT DOCUMENTS

| | | | | |
|---|---|---|---|---|
| 4,893,846 A * | 1/1990 | McGraw | ............... | F16B 7/0486 |
| | | | | 285/133.4 |
| 5,046,878 A * | 9/1991 | Young | ..................... | E04C 5/165 |
| | | | | 403/265 |
| 9,163,394 B1 * | 10/2015 | Barker | ............... | E04B 1/34384 |
| 2004/0195828 A1 * | 10/2004 | Holmes | ................. | F16L 41/023 |
| | | | | 285/131.1 |
| 2014/0167404 A1 * | 6/2014 | Wilson | ..................... | G10G 5/00 |
| | | | | 285/125.1 |

FOREIGN PATENT DOCUMENTS

| | | | | |
|---|---|---|---|---|
| WO | WO-9833994 A1 * | 8/1998 | ............. | E04C 5/165 |
| WO | WO-9844215 A1 * | 10/1998 | ............. | E04C 5/165 |
| WO | WO-2011014808 A1 * | 2/2011 | ............. | E04C 5/166 |
| WO | WO-2016138912 A1 * | 9/2016 | ............. | E04C 5/165 |

\* cited by examiner

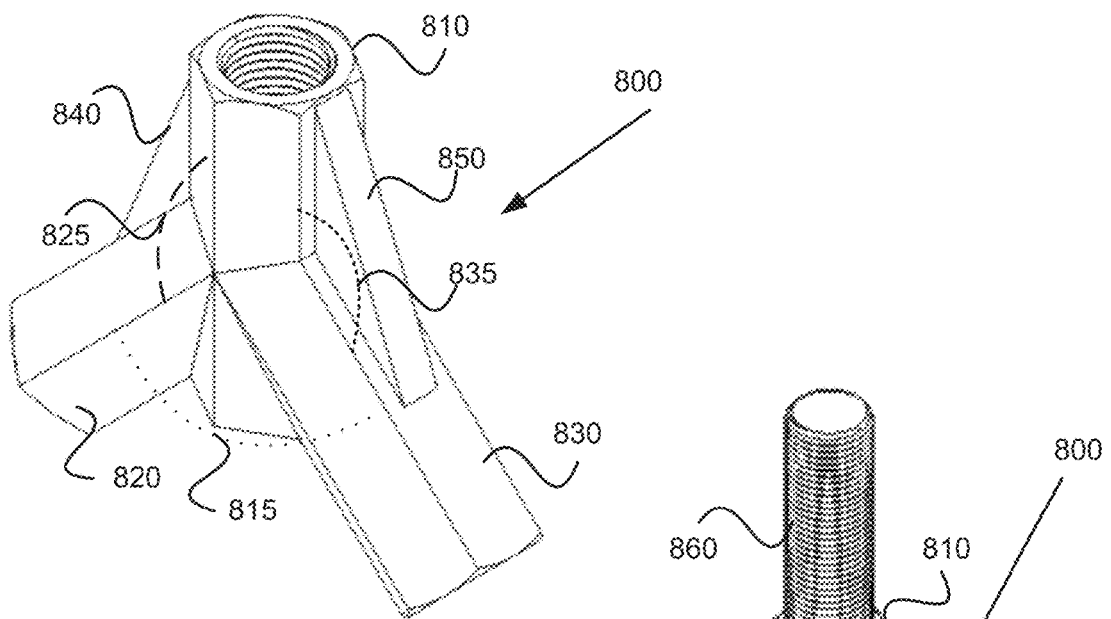
FIG. 8A
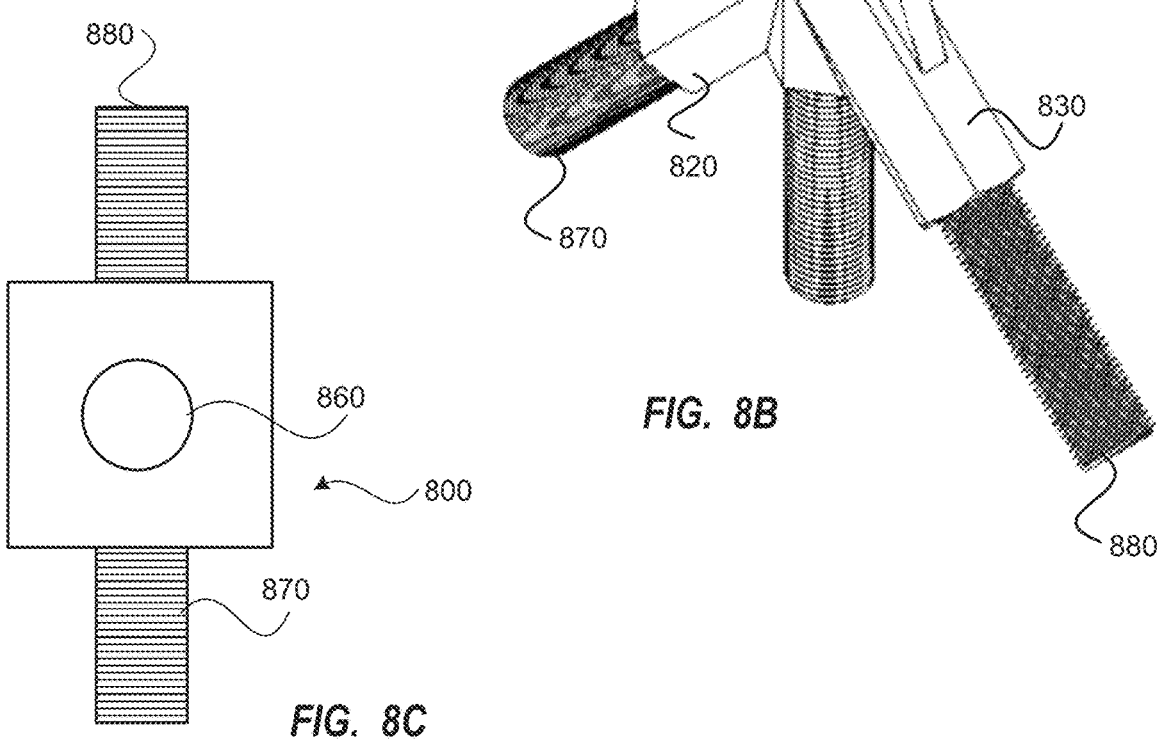
FIG. 8C
FIG. 8B

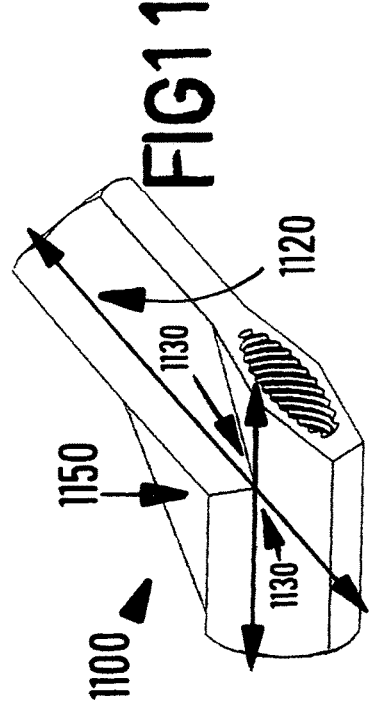
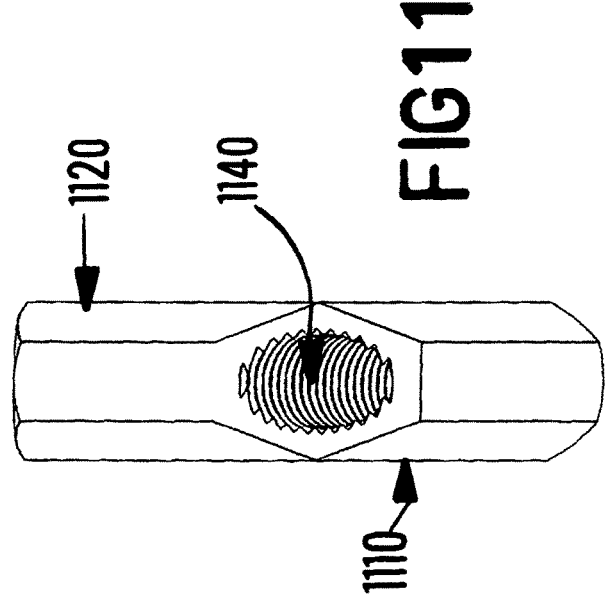
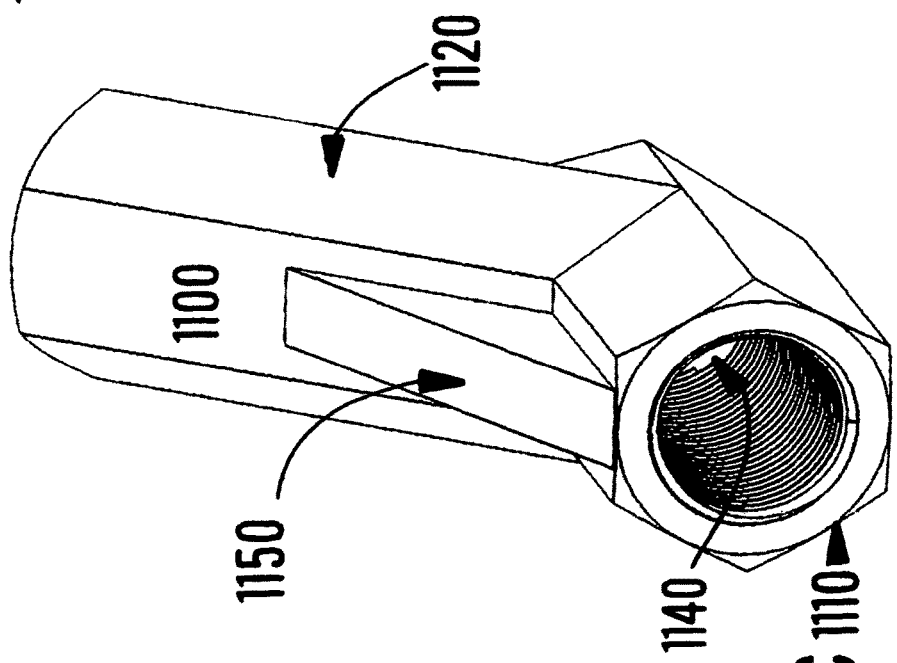

THREADED ROD COUPLING WITH MAIN RECEPTACLE AND ONE OR MORE RECEPTACLES EXTENDING THEREFROM AT AN ANGLE

PRIORITY

This application claims the priority under 35 USC § 119 of Provisional Application 62/847,795 filed on May 14, 2019, entitled "Angled Threaded Rod Coupling" and having John Tutino as inventor. Application 62/847,795 is herein incorporated by reference in its entirety.

BACKGROUND

Threaded rod is commonly used in the construction industry. The threaded rod can be used, for example, to support various items. The threaded rod is typically mounted to a ceiling and/or floor and then connected to some type of support member (e.g., rail, bracket). The support member is to, for example, provide support, hold and/or secure to an object (e.g., plumbing, HVAC). The threaded rod may be secured to the floor and/or ceiling by threading it into a support (anchor bolt, insert) that is mounted to the floor/ceiling, where the support includes an internally threaded receiving portion. The threaded rod may be secured to a connection point on the support member with, for example, one or more threaded through bolts. Basically, the threaded rod is for the purpose of fastening anything to the floor/ceiling using the mounted support and a through bolt. The floor/ceiling mounted support should be aligned with the connection point on the support member so that the threaded rod runs in a substantially straight line therebetween.

FIG. 1A illustrates an example threaded rod 100 connecting a mounted support 110 in a ceiling 115 and a connection point 120 in a support member 125 used to support, for example, a pipe 130. As illustrated, the threaded rod 100 is threaded into the mounted support 110 and is secured to the connection point 120 using one or more bolts 140 (a top and bottom bolt illustrated).

The mounted support 110 and the connection point 120 are not always aligned for various reasons. Rather, the mounted support 110 and the connection point 120 may be spaced apart in one or more directions. In these cases, the threaded rod 100 is not able to run in a straight line between the mounted support 110 and the connection point 120. Rather, the threaded rod 100 extending from the mounted support 110 may need to be bent (e.g., two times) in order to be able to connect to the support member 125.

FIG. 1B illustrates an example threaded rod 100 having to connect a misaligned mounted support 110 and connection point 120. As such, the threaded rod 100 cannot run therebetween in a straight line. Rather, the threaded rod 100 must be square with both the mounted support 110 and the connection point 120 and be bent therebetween in order to provide the connection to both. As illustrated, the threaded rod 100 includes a first portion 150 that extends substantially perpendicular to the ceiling 115. The rod 100 is then bent at a first angle 155 in a direction toward the connection point 120. A second portion 160 of the rod 100 then traverses downward at the angle 155 until it substantially reaches location of the connection point 120. At this point the rod 100 is bent at a second angle 165 in a direction toward the connection point 120. A third portion 170 of the rod 100 traverses downward substantially perpendicular to the ceiling 115 and parallel to the first portion 150 and is secured to the connection point 120 with the bolt(s) 140.

Each angle 155, 165 may be 45 degrees and the length of the second portion 160 may be approximately 1.41 times the distance that the rod is moved horizontally 180 (distance between first portion 150 and the third portion 170).

In order to bend the threaded rod 100 as illustrated in FIG. 1B, the rod likely needs to be heated to the point where it becomes flexible and can be bent into place. The larger the diameter of the threaded rod the more difficult it is to bend. The heating and bending of the threaded rod is time consuming. Furthermore, it takes a certain amount of skill to make sure the angles and distances are correct to get the threaded rod shaped so that it can be used. Moreover, the heating and bending of the threaded rod may compromise the integrity of the threaded rod.

In some instances, the support member may be supported by more than a single point. For example, in areas susceptible to earthquakes or in locations that may be susceptible to vibrations or movement, the support member may be supported from various directions to provide seismic restraint to the support member and the object being supported.

FIG. 2 illustrates the use of a seismic restraint system 200 providing support to the support member 125 supporting the object 130 (e.g., pipe). The system 200 includes a main bracket (e.g., U channel) 210 and a swivel bracket 220, 230 on each side thereof. A first swivel bracket 220 would be connected to the ceiling (not labeled) and a second swivel bracket 230 is connected to the support member 125. The seismic restraint system 200 is connected to a different portion of the support member 125 than the main support (threaded rod 100). The threaded rod 100 is square with the support member 125 and holds the support bracket 125 from above while the seismic restraint system 200 provides support from the side.

Storm pipes may have a surge flowing therethrough and in order to ensure the various pipes do not come apart during these surges, the storm pipes typically use restraints to secure the different pipes together.

FIG. 3 illustrates a storm-pipe restraint system 300 used for securing storm pipes together. The illustrated system 300 is for two separate storm pipes that merge together at an angle (using an angled pipe). The system includes a plurality of brackets 310, a plurality of clamps 320 and a plurality of arms 330. The brackets 310 are used to wrap around the pipes and the clamps 320 are used to tighten the brackets to the pipe. The arms 330 are connected between the different clamps 310 in order to help secure the pipes together.

What is needed, is an easier and more convenient way to adjust the threaded rod so that it can be used in situations where the mounted support and the connection point are not aligned or where multiple pieces of threaded rod need to be connected in some fashion. What is needed is an angled coupling that can receive multiple pieces of threaded rod in order to adjust the location of the threaded rod without the need to heat and bend the rod as discussed above. Furthermore, such an angled coupling could be used for seismic restraints and/or storm surge restraints.

BRIEF DESCRIPTION OF DRAWINGS

The features and advantages of the various embodiments will become apparent from the following detailed description in which:

FIGS. 8A-C illustrate several views of an example dual angled coupling that could be used to angle the threaded rod in two different directions, according to one embodiment.

FIGS. 11A-C illustrate several views of an example angled coupling that enables a first threaded rod to pass therethrough and a second threaded rod to be connected thereto at an angle.

DETAILED DESCRIPTION

Figure 1A:
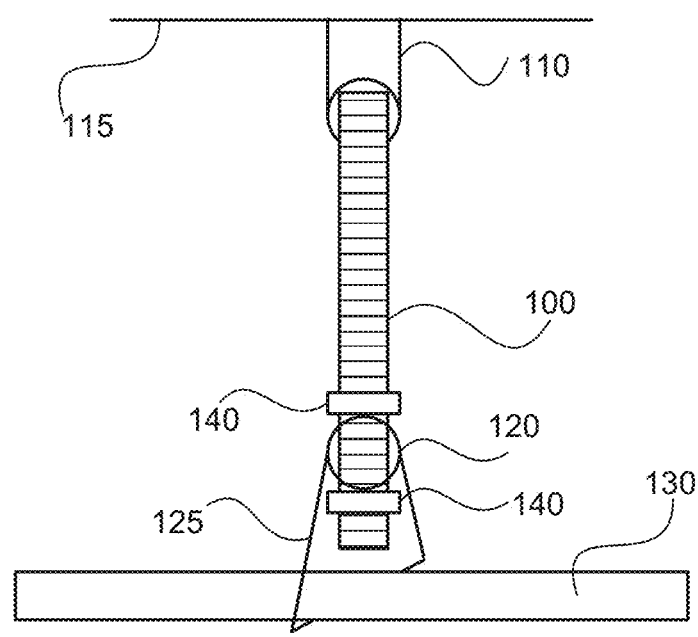
FIG. 1A illustrates an example threaded rod connecting a mounted support in a ceiling and a connection point in a support member used to support, for example, a pipe.
Figure 1B:
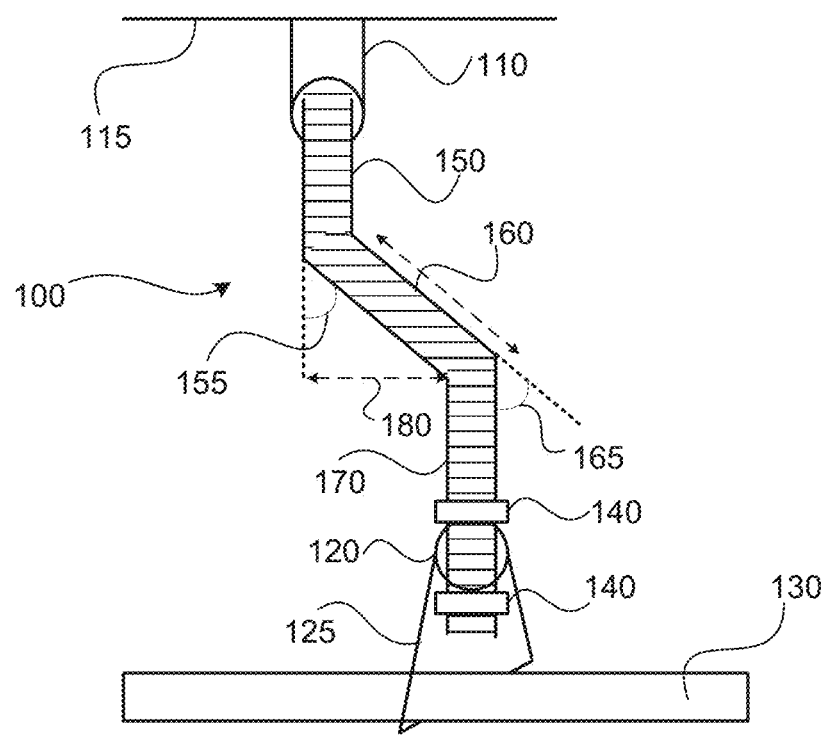
FIG. 1B illustrates an example threaded rod having to connect a misaligned mounted support and connection point.
Figure 2:
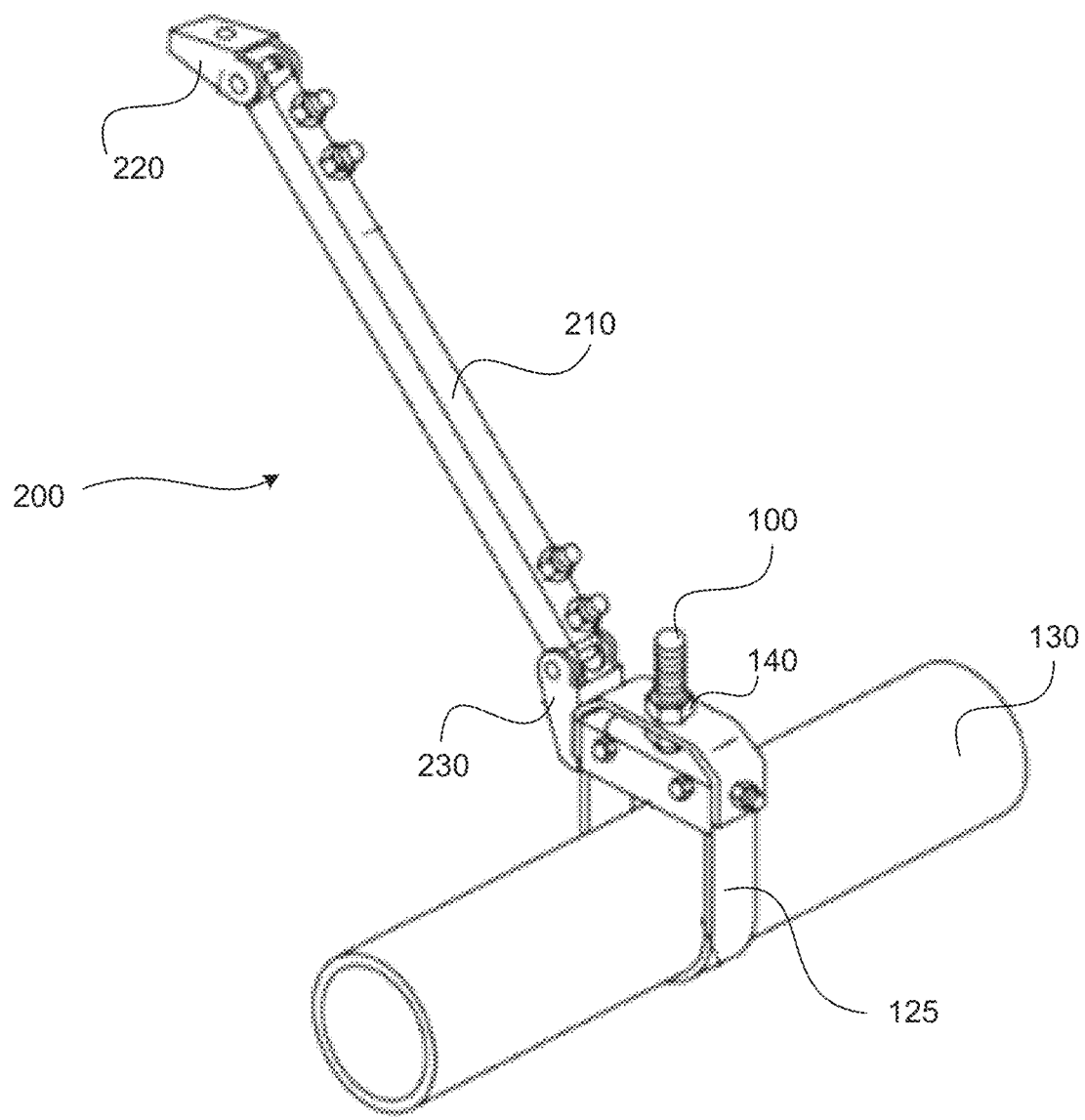
FIG. 2 illustrates the use of a seismic restraint system providing support to the support member supporting the object (e.g., pipe).
Figure 3:
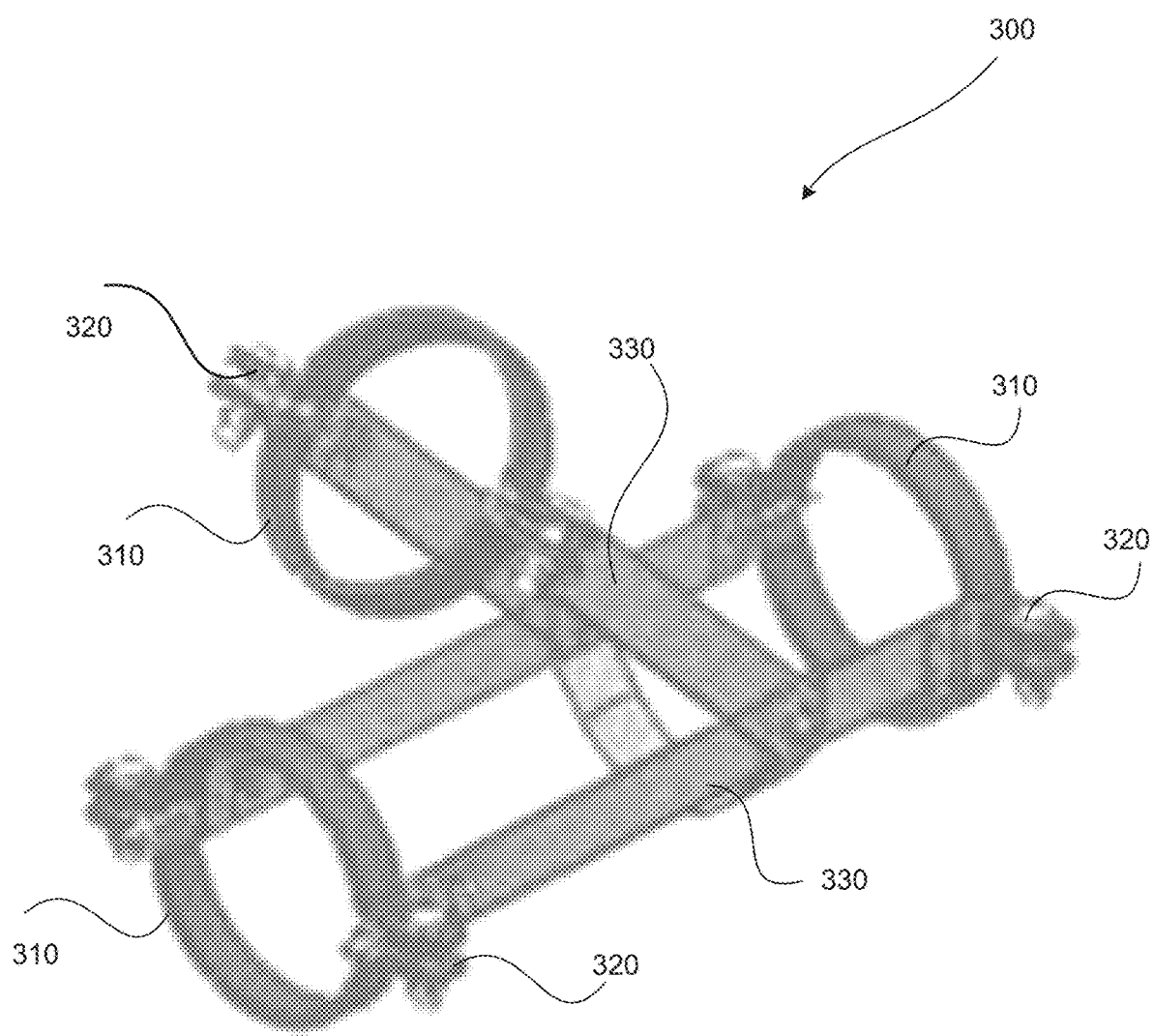
FIG. 3 illustrates a storm-pipe restraint system used for securing storm pipes together.
Figure 4A:
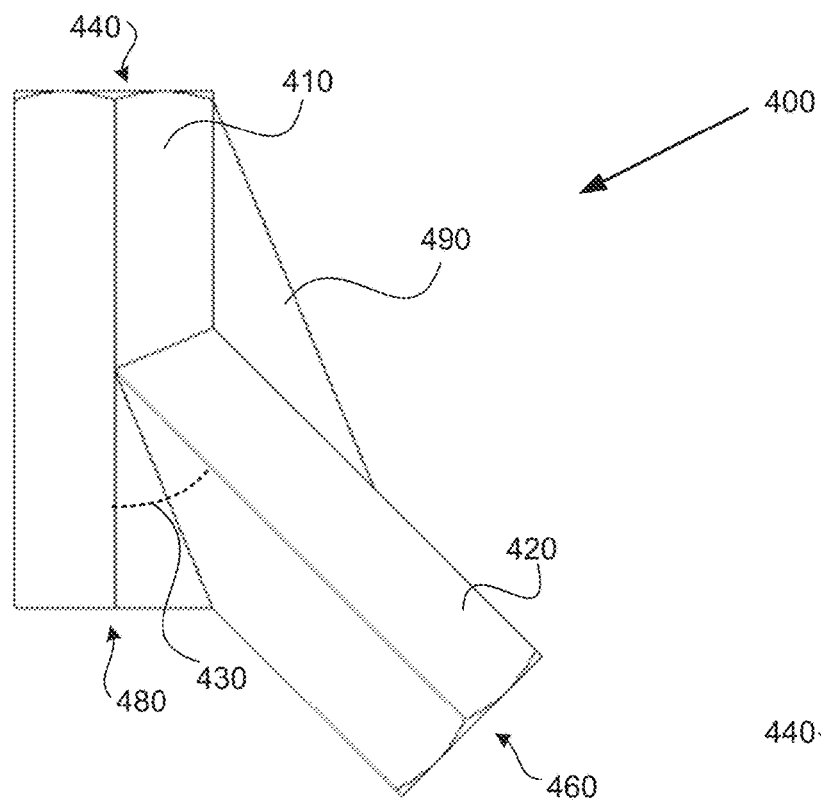
FIGS. 4A-C illustrate several views of an example single angled coupling that could be used to angle the threaded rod rather than bending the rod, according to one embodiment.
Figure 4B:
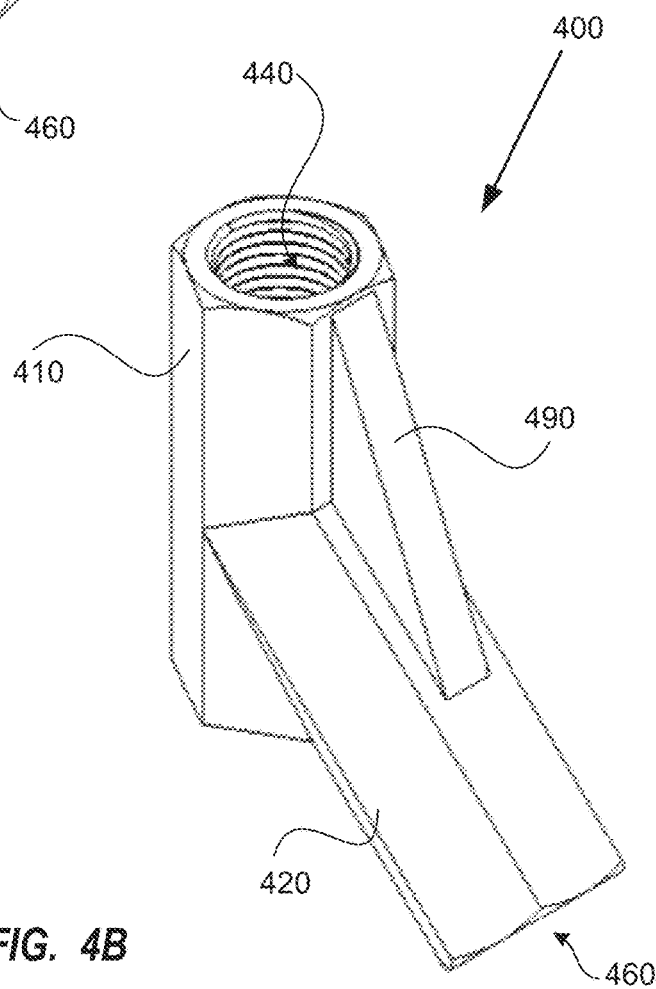
Figure 4C:
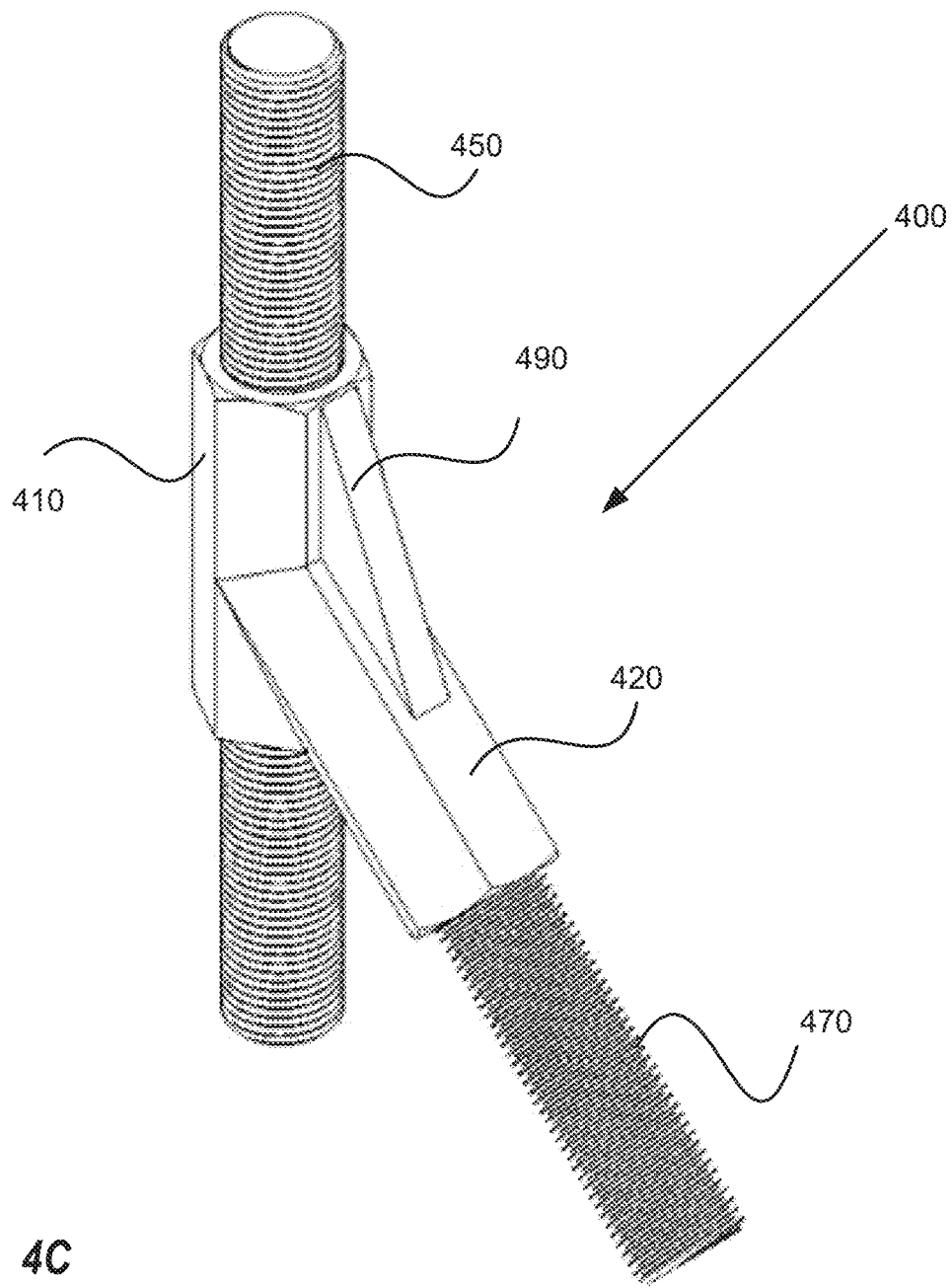

FIGS. 4A-C illustrate several views of an example single angled coupling 400 that could be used to angle the threaded rod rather than bending the rod. The angled coupling 400 includes a first internally threaded receptacle (coupler) 410 and a second internally threaded receptacle (coupler) 420 that is rotated at a 45-degree angle 430 from the first coupler 410. The angle 430 is not limited to 45 degrees, but rather could be other standard angles that may be used in the field (e.g., 30 degrees, 60 degrees). The first coupler 410 may have an opening 440 for receiving a first threaded rod 450. The second coupler 420 may have an opening 460 for receiving a second threaded rod 470 that extends at the 45-degree angle 430 from the first threaded rod 450.

According to one embodiment, the first coupler 410 may include a second opening 480 at an opposite end thereof. The first coupler 410 may be a passthrough coupler where an interior is open from the opening 440 to the opening 480. The first coupling 410 may enable the first threaded rod 450 to pass therethrough or may receive a different threaded rod from each side thereof.

According to one embodiment, the second end of the first coupler 410 may be closed so that the first threaded rod 450 is simply secured therewithin. According to one embodiment, in order to provide additional support, a support bracket 490 may be utilized between the two couplers 410, 420.

The size of the openings and the threading (as visible in FIG. 4B) within the couplers 410, 420 of the angled coupling 400 may be based on the type of threaded rod 450, 470 that it is being used. According to one embodiment, the diameter of the openings 440, 460 (and possibly 480) and the threading within each coupler 410, 420 may be the same. However, the invention is in no way limited thereto. Rather, the diameter of the openings 440, 460 (and possibly 480) and/or threading for each of the couplers 410, 420 may be different based on the desired configuration in the field. For example, maybe it is desired for the second threaded rod 470 to have a larger diameter than the first threaded rod 450.

According to one embodiment, at least one of the couplers 410, 420 may include a plurality of opening diameters so that it can be used with various sized threaded rod. The largest opening may be located closest to the exterior and the smallest may be located closest to the angle. Larger threaded rod could secure to the threads of the outer opening diameter while smaller threaded rod could pass through the outer opening diameter and be secured to the threads of the inner opening diameter. According to one embodiment, one or more inserts could be utilized to enable the angled coupling 400 to be utilized with threaded rod that is a smaller size than the couplers 410, 420. The various diameter/thread sizes provided by the coupler or the inserts may enable a standard single angled coupling 400 to be used in different situations rather than needing different angled couplings for different situations.

According to one embodiment, the angled coupling 400 is made from a high strength material. The materials utilized may include for example, steel, cast iron, composites, high strength plastics, or combinations thereof. According to one embodiment, if the coupling 400 was used in a storm-pipe restraint system it may be made of stainless steel (or other materials with the desired strength and anti-rusting properties) to prevent rusting.

According to one embodiment, the angled coupling 400 may be manufactured with the desired angle 430. Various methods in which the angled coupling 400 may be manufactured (e.g., machined, extruded) are within the current scope. According to one embodiment, the angled coupling 400 may be formed by, for example, welding two straight couplers together (e.g., couplers 410, 420). In order to weld the straight couplers together an end of one or both of the couplers may be cut at a certain angle so that when they are put together the angled coupling 400 has the desired angle 430.

According to one embodiment, the angled coupling 400 may be manufactured with the support bracket 490. According to one embodiment, the support bracket 490 may be manufactured separate and may be added to the angled coupling 400 by, for example, welding.

Figure 5A:
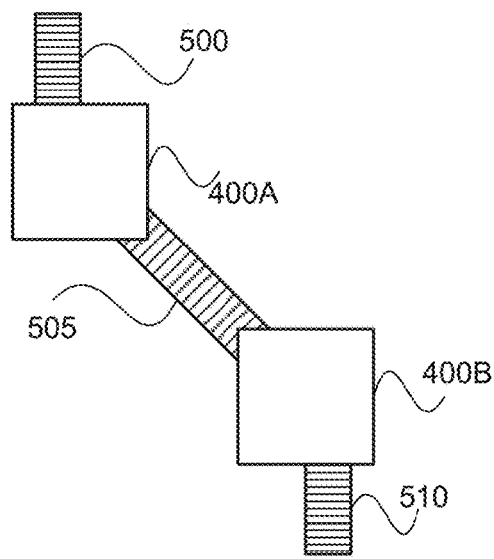
FIGS. 5A-D illustrate several views of the example single angled couplings of FIGS. 4A-C utilized in practical applications, according to different embodiments.

FIGS. 5A-D illustrate several views of the example single angled coupling 400 utilized in practical applications. It should be noted that for ease of illustration the angled coupling 400 is simply illustrated as a box. FIG. 5A illustrates two angled couplings 400A, 400B utilized to shift the threaded rod a certain distance (to the right as illustrated). This type of implementation may be utilized when, for example, a mounted support (not illustrated) in a ceiling (not illustrated) is not aligned with a connection point (not illustrated) in a support member (not illustrated). A first threaded rod 500 extends from the mounted support to a first angled coupling 400A that receives the first threaded rod 500 square. A second threaded rod 505 extends from the first angled coupling 400A at a fixed angle (preferably 45 degrees but not limited thereto). The second threaded rod 505 is received at a fixed angle (e.g., 45 degrees) by a second angled coupling 400B. A third threaded rod 510 extends downward from the second angled coupling 400B to, for example, be secured to the connection point in the support member. It should be noted that the second angled coupling 400B is utilized in opposite manner of the first angled coupling 400A (e.g., it has been rotated around both horizontal and vertical axes so that it receives angled threaded rod at upper left as opposed to lower right, and straight threaded rod extends from bottom as opposed to top).

Figure 5B:
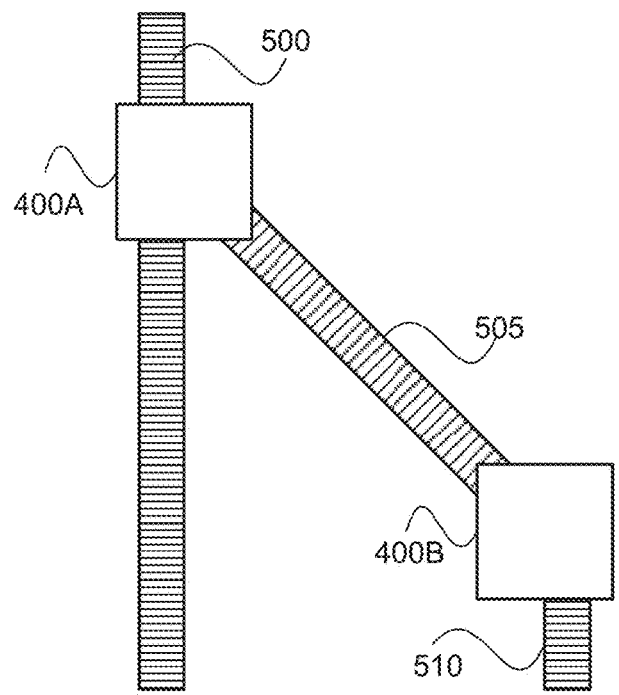

FIG. 5B illustrates the same two angled couplings 400A, 400B being utilized to provide another threaded rod a certain distance away from threaded rod secured to mounted support in the ceiling (to the right as illustrated). This type of implementation may be utilized when, for example, a mounted support may not be practical or possible to mount in the ceiling above an additional connection point in a support member. In this embodiment, the first threaded rod 500 passes through the first angled coupling 400A so that it can be secured to a first connection point (not illustrated) on the support member (not illustrated) and the third threaded rod 510 can be secured to a second connection point (not illustrated) on the support member (not illustrated). It should be noted that the third threaded rod 510 could be used to secure to other support members rather than the same support member.

Figure 5C:
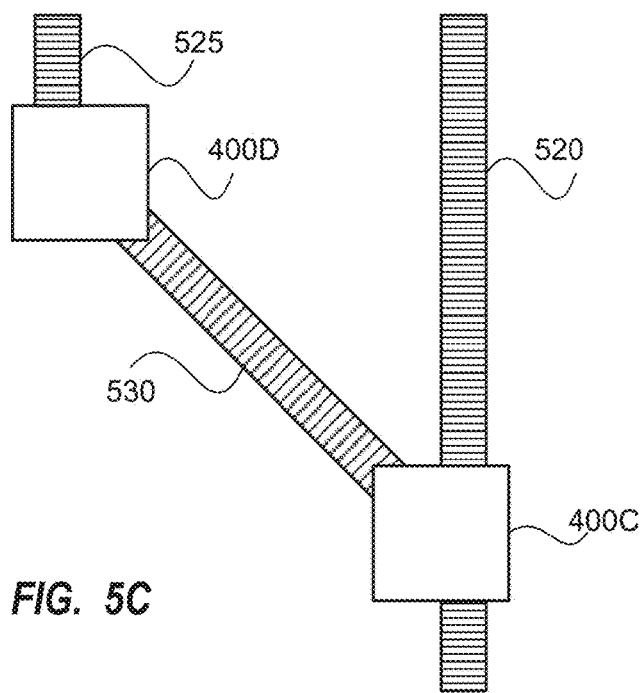

FIG. 5C illustrates two single angled couplings 400C, 400D being utilized to provide a seismic restraint system to reduce or eliminate sway in a support member or the object (e.g., pipe) being supported therein. This type of implementation may be utilized, for example, in areas susceptible to earthquakes or in locations that may be susceptible to vibrations or movement. A first threaded rod 520 extends downward from a first mounted support (not illustrated) in a ceiling (not illustrated) in order to secure to a connection point (not illustrated) in a support member (not illustrated) as would typically be the case. However, the first threaded rod 520 passes through a first angled coupling 400C. A second threaded rod 525 extends downward from a second mounted support (not illustrated) in the ceiling a certain distance away from the first mounted support (to the left as illustrated). The second rod 525 is received by a second angled coupling 400D. A third threaded rod 530 extends from the second angled coupling 400D at a fixed angle (preferably 45 degrees but not limited thereto). The third threaded rod 530 is received at a fixed angle (e.g., 45 degrees) by the first angled coupling 400C. The third threaded rod 530 provides the sway support for the support member. It should be noted that the second angled coupling 400D is utilized in opposite manner of the first angled coupling 400C.

Figure 5D:
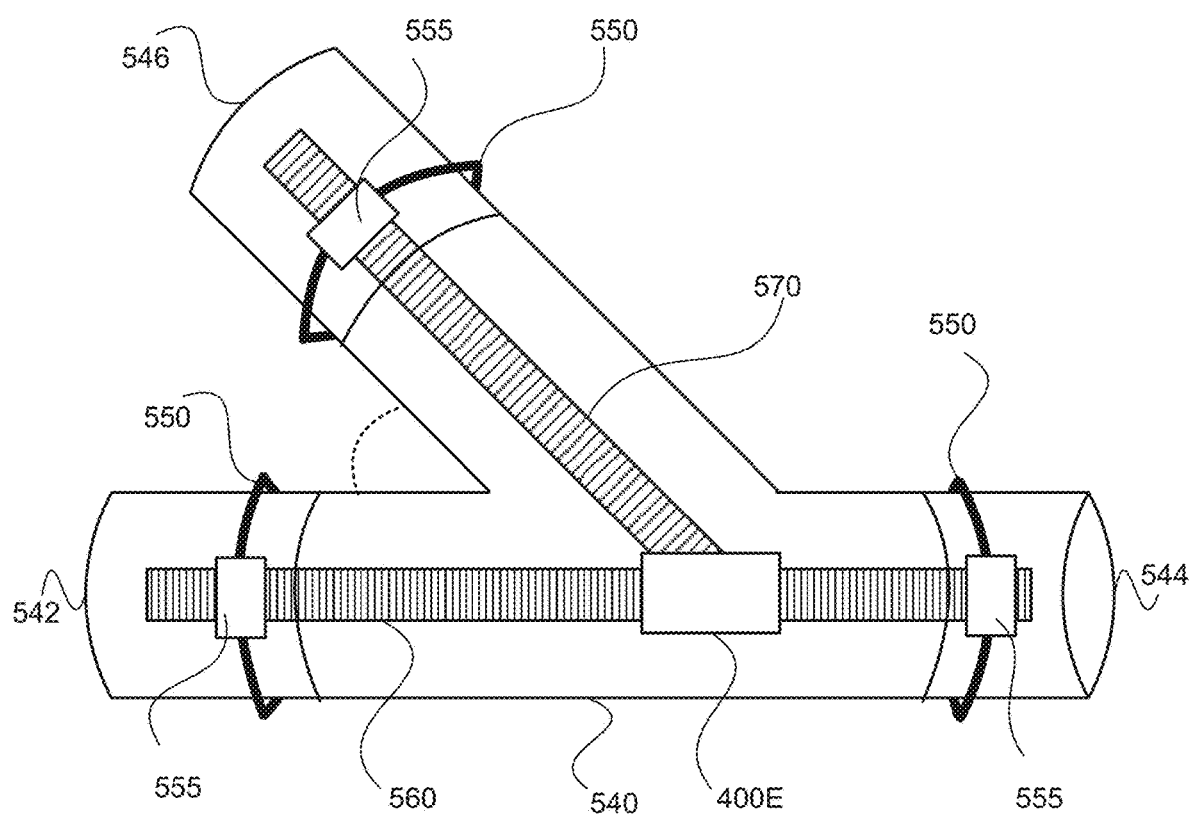

FIG. 5D illustrates an angled coupling 400E being utilized as part of a storm-pipe restraint system to ensure storm pipes do not come apart when a surge flows therethrough. As illustrated, a storm pipe system includes a main storm pipe traversing horizontally and a second storm pipe merging with the first storm pipe via an angled pipe (e.g., 45 degrees) 540. The main storm pipe includes pipes 542, 544 connecting to horizontal ends of the angled pipe 540. The second storm pipe includes a pipe 546 connecting to the angled end of the angled pipe 540. The storm-pipe restraint system is to hold the angled pipe 540 to the other pipes 542, 544, 546 connecting thereto.

The storm-pipe restraint system includes a plurality of brackets 550, a plurality of clamps 555, a plurality of threaded rods 560, 570 and the angled coupling 400E. The brackets 550 are used to wrap around the pipes 542, 544, 546 and the clamps 555 are used to tighten the brackets 550 to the pipes 542, 544, 546 as well as secure the threaded rods 560, 570. The angled coupling 400E is used to secure the threaded rods 560, 570 together. The first threaded rod 560 passes through the angled coupling 400E and the second threaded rod 570 is received at the defined angle (e.g., 45 degrees). The threaded rods 560, 570, the brackets 550, the clamps 555 and the angled coupling 400E help secure the pipes 540, 542, 544, 546 together.

FIGS. 6A-D illustrate several views of an example dual angled coupling 600 that could be used to angle the threaded rod in two different directions. The angled coupling 600 includes a first internally threaded receptacle (coupler) 610, a second internally threaded receptacle (coupler) 620 that is rotated at a 45-degree angle 625 from the first coupler 610 and a third internally threaded receptacle (coupler) 630 that is also rotated at a 45-degree angle 635 from the first coupler 610 but in a different direction than the second coupler 620. The second coupler 620 and the third coupler 630 are separated by a 90-degree angle 615 on the axis of the first coupler 610. The angle 615 can best be seen in the simplified top view of FIG. 6D. A first threaded rod 660 is received at the top of the angled coupling 600, a second threaded rod 670 extends from a front side thereof at the angle 625 (the angle cannot be seen) and a third threaded rod 680 extends from a right side thereof at the angle 635 (the angle cannot be seen).

The angles 625, 635 are not limited to 45 degrees, but rather could be other standard angles that may be used in the field (e.g., 30 degrees, 60 degrees). The angles 625, 635 may be the same or may be different. According to one embodiment, the first coupler 610 may be a passthrough coupler where an interior is open from a first side to a second side so that the first threaded rod 660 can pass therethrough or a different threaded rod may be received from each side thereof. According to one embodiment, the second end (bottom as illustrated) of the first coupler 610 may be closed so that the first threaded rod 660 is simply secured therewithin. According to one embodiment, in order to provide additional support, a first support bracket 640 may be used between the first coupler 610 and the second coupler 620 and a second support bracket 650 may be used between the first coupler 610 and the third coupler 630.

According to one embodiment, the angled coupling 600 is made from a high strength material. The materials utilized may include for example, steel, cast iron, composites, high strength plastics, or combinations thereof.

According to one embodiment, the angled coupling 600 may be manufactured (e.g., machined, extruded) with the second and third couplers 620, 630 extending at the desired angles 625, 635 from the first coupler 610 and the desired angle 615 from each other. According to one embodiment, the angled coupling 600 may be formed by, for example, welding the second and third couplers 620, 630 to the first coupler 610. In order to weld the second and third couplers 620, 630 to the first coupler 610 the second and third couplers 620, 630 may be cut at the defined angles 625, 635. According to one embodiment, the angled coupling 600 may be manufactured with the support brackets 640, 650. According to one embodiment, the support bracket brackets 640, 650 may be manufactured separate and may be added to the angled coupling 600 by, for example, welding.

The size of the openings and the thread pattern of each of the couplers 610, 620, 630 may be based on the type of threaded rod 660, 670, 680 that it is being used. The openings and the thread pattern of each of the couplers 610, 620, 630 may be the same or may be different.

According to one embodiment, at least one of the couplers 610, 620, 630 may include a plurality of opening diameters with the largest opening located closest to the exterior. Larger threaded rod could secure to the threads of the outer opening diameter while smaller threaded rod could pass through the outer opening diameter and be secured to the threads of the inner opening diameter. According to one embodiment, one or more inserts could be utilized to provide different sized diameters.

Figure 6A:
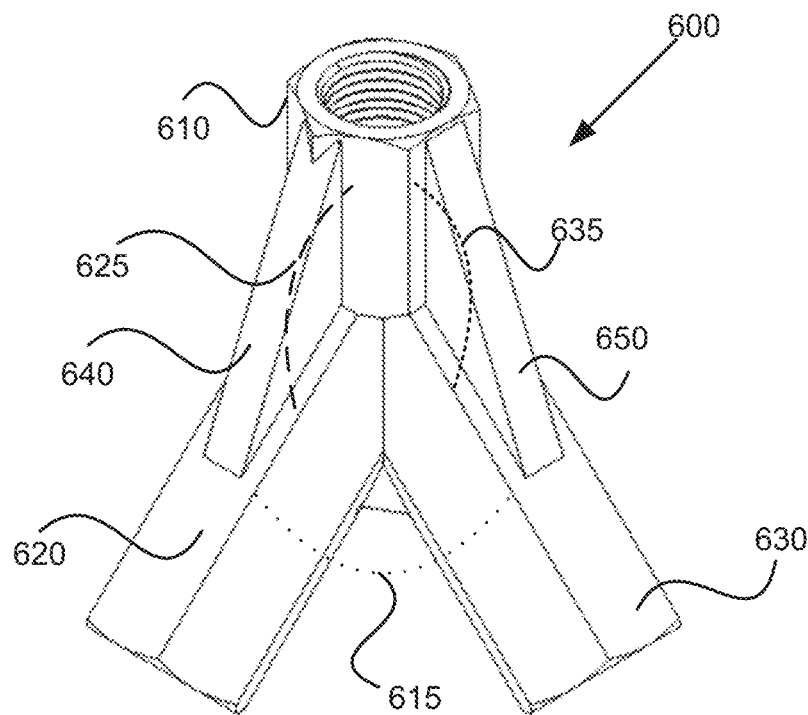
FIGS. 6A-D illustrate several views of an example dual angled coupling that could be used to angle the threaded rod in two different directions, according to one embodiment.
Figure 6B:
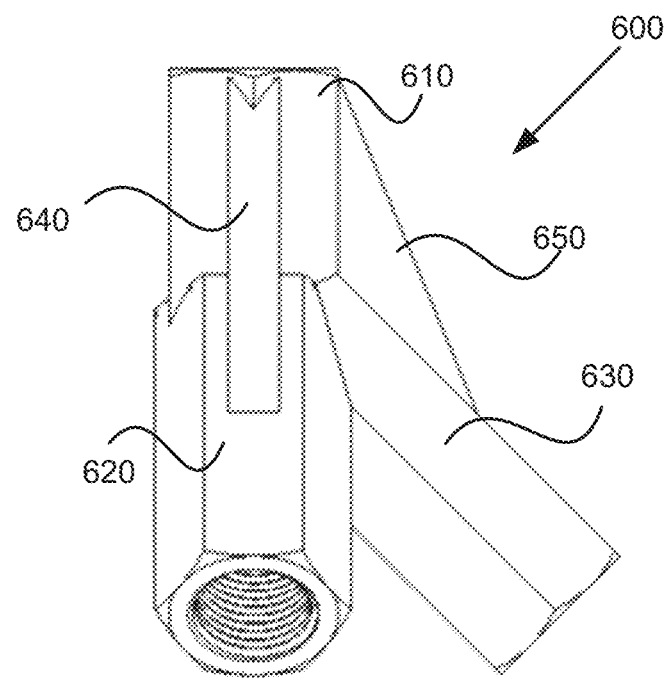
Figure 6C:
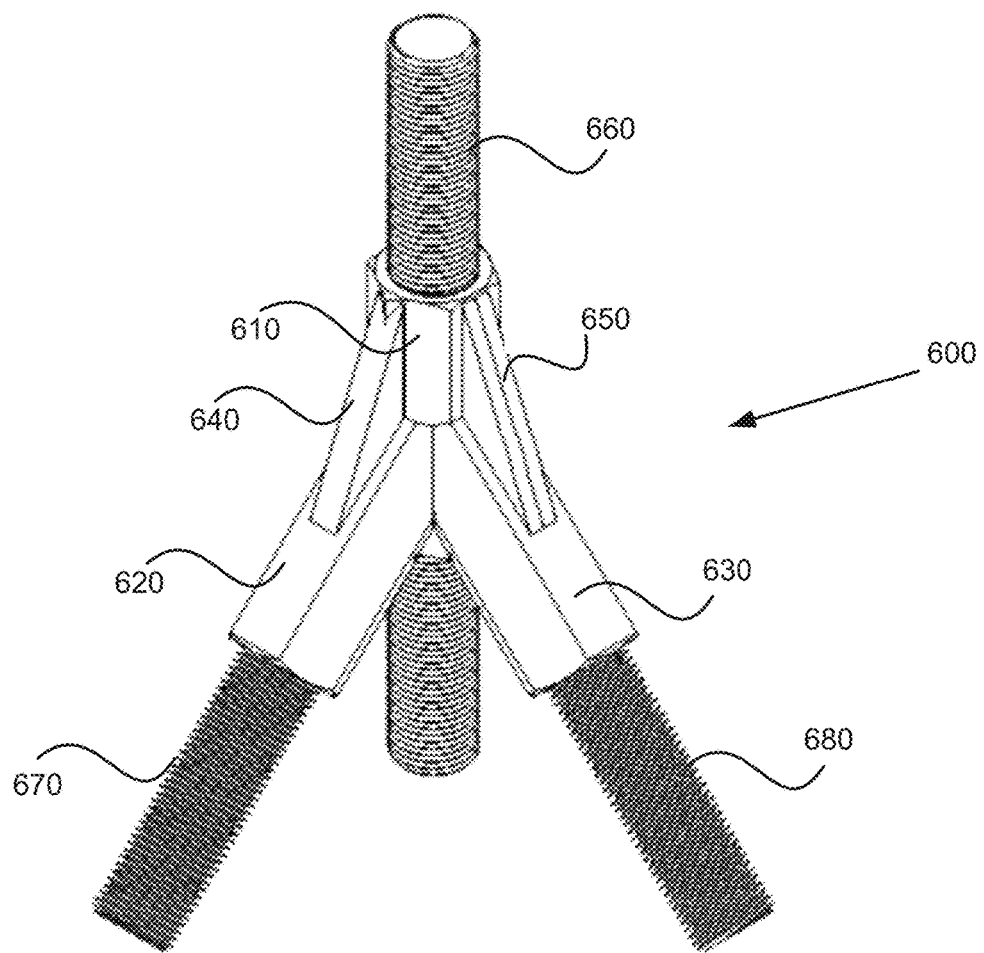
Figure 6D:
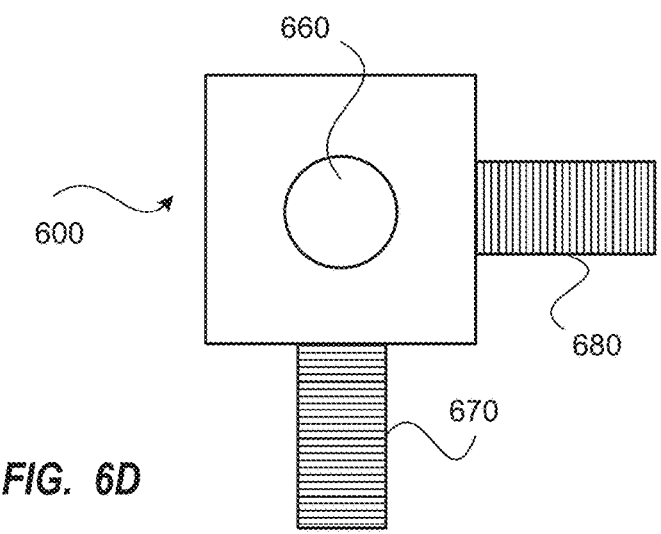
Figure 7A:
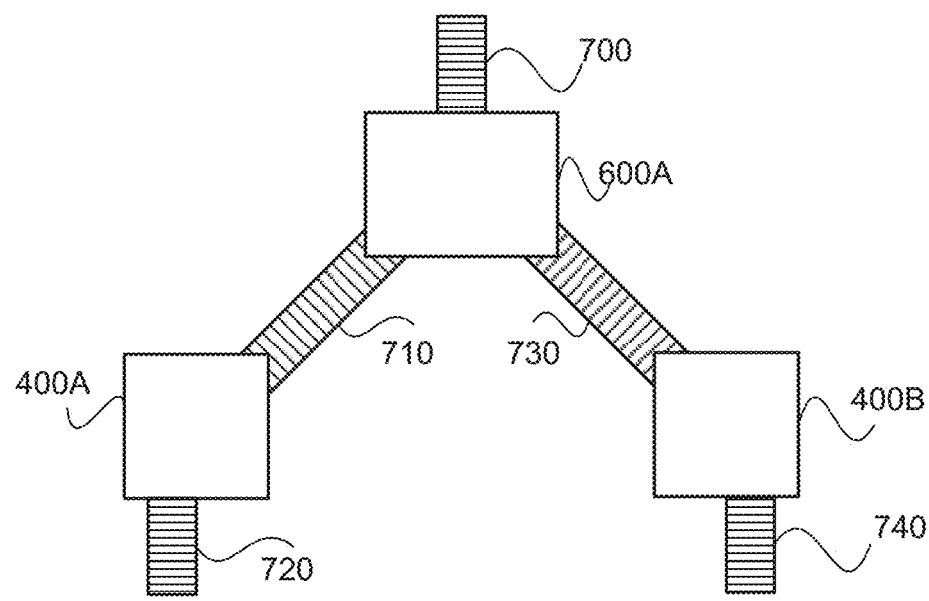
FIGS. 7A-C illustrate several views of the example dual angled coupling of FIGS. 6A-D utilized with the example single angled couplings of FIGS. 4A-C in practical applications, according to different embodiments.
Figure 7B:
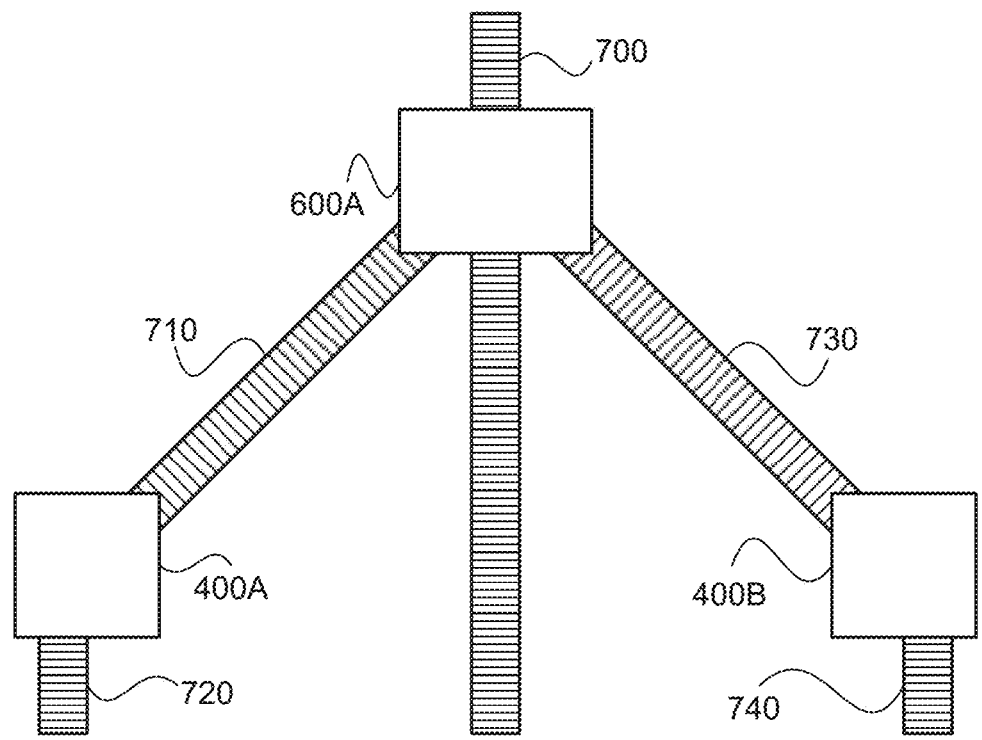
Figure 7C:
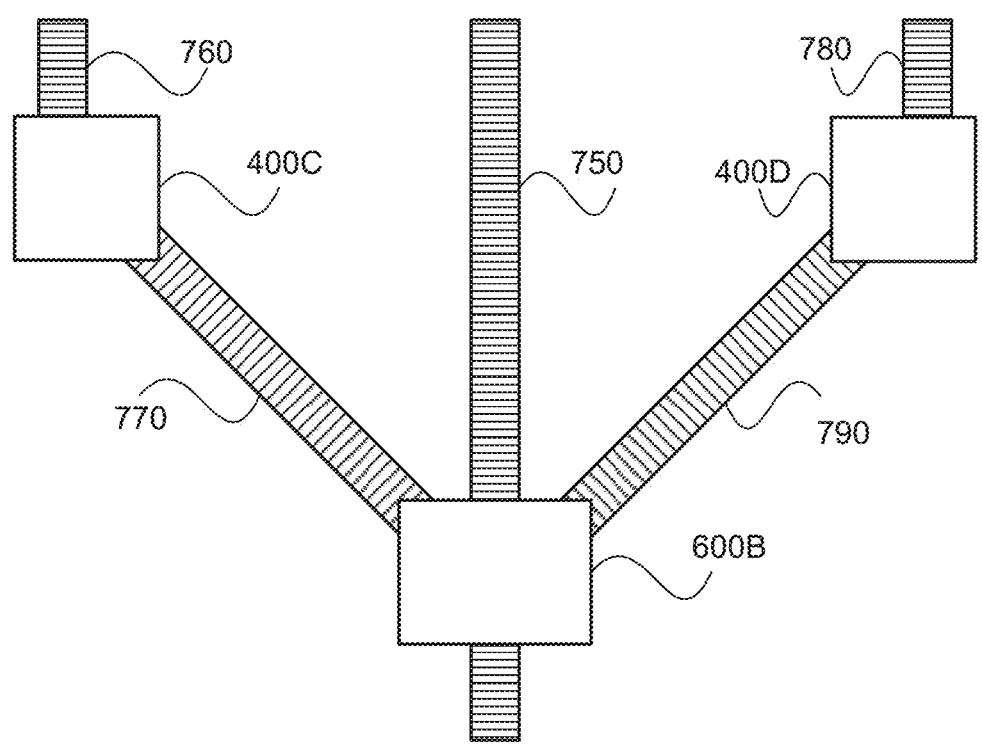
Figure 9A:
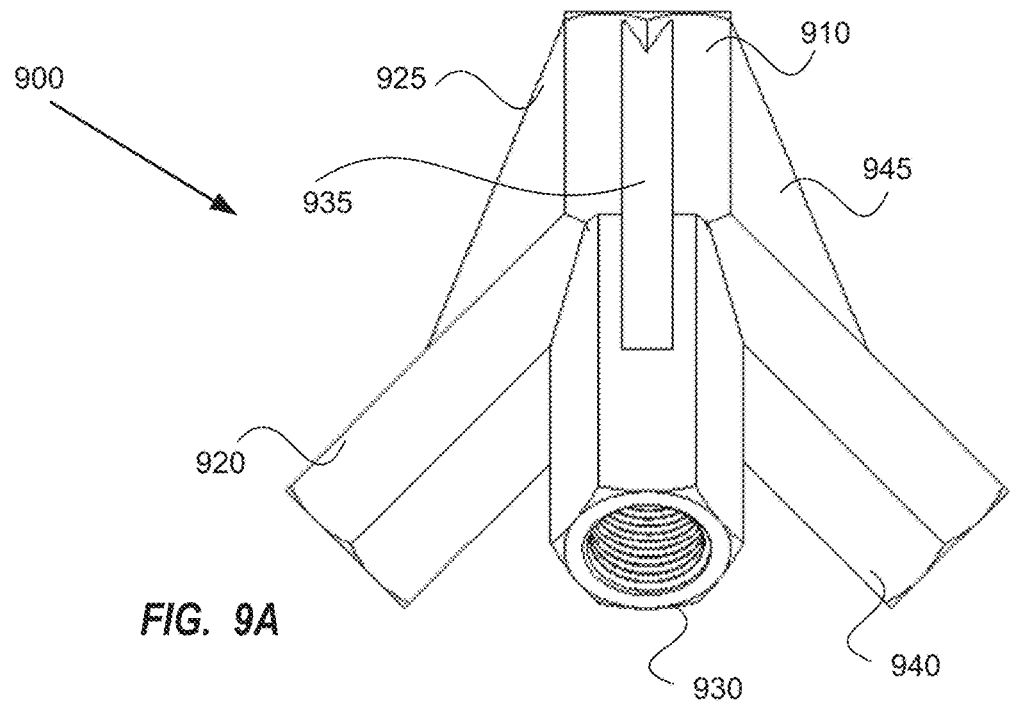
FIGS. 9A-D illustrate several views of an example quad angled coupling that could be used to angle the threaded rod in four different directions, according to one embodiment.
Figure 9B:
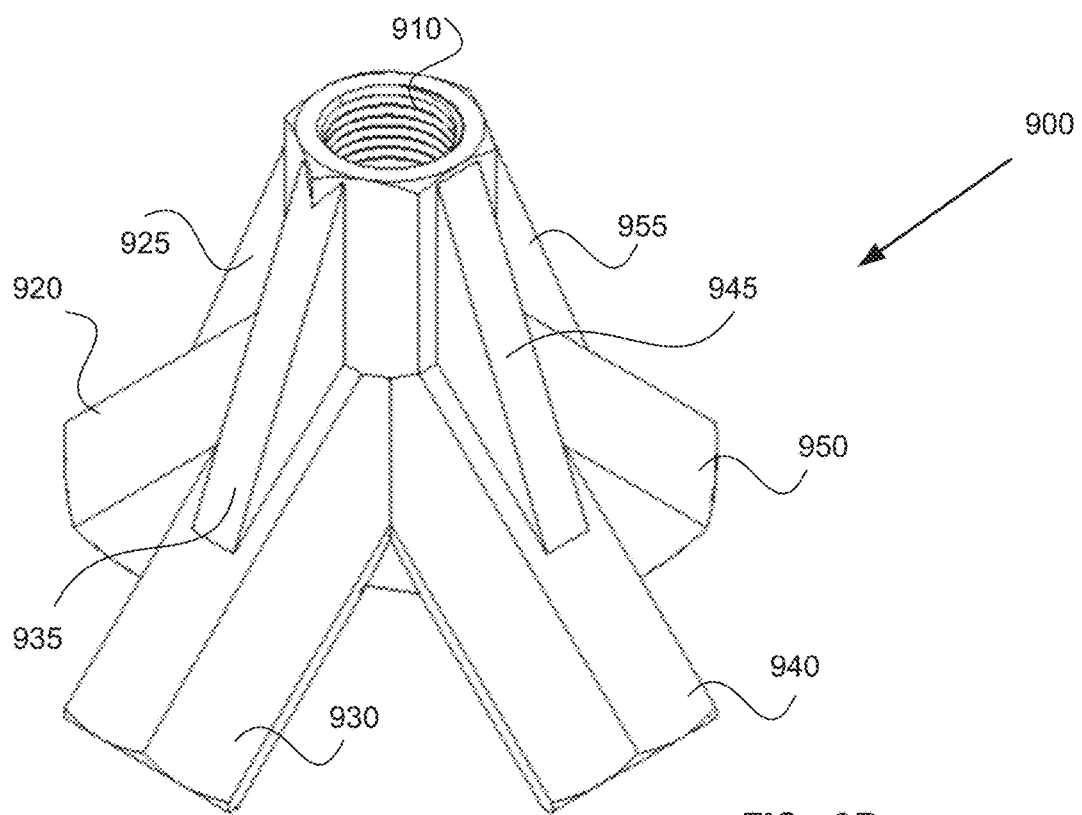
Figure 9C:
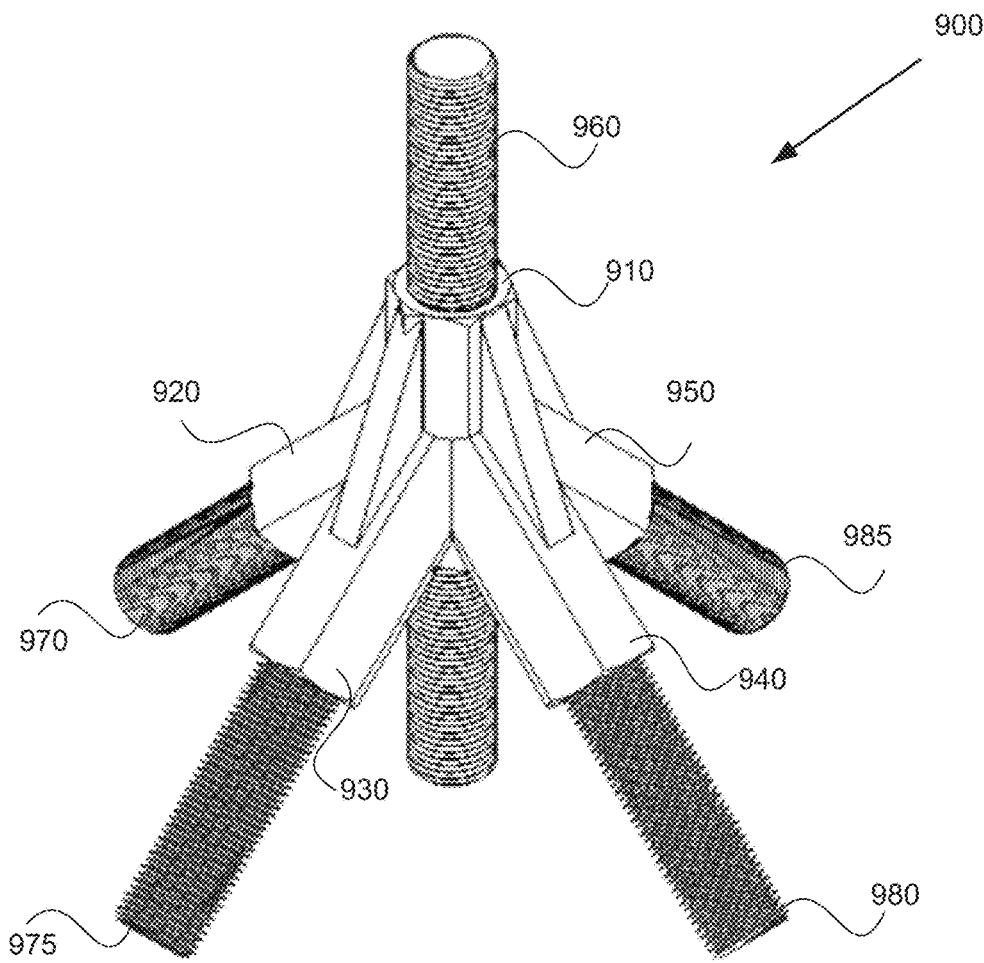
Figure 9D:
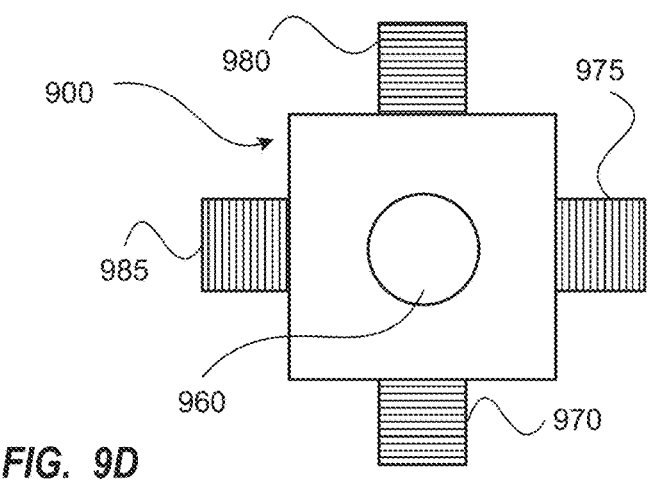

FIGS. 7A-C illustrate several views of the example dual angled coupling 600 utilized with the example single angled coupling 400 in practical applications. It should be noted that for ease of illustration the angled couplings 400, 600 are simply illustrated as a box. FIG. 6A illustrates a dual angled coupling 600A and two single angled couplings 400A, 400B utilized to shift a threaded rod a certain distance in two different directions (to the left and right as illustrated). A first threaded rod 700 extends from the mounted support to the dual angled coupling 600A that receives the first threaded rod 700 square. A second threaded rod 710 extends from the dual angled coupling 600A at a fixed angle (preferably 45 degrees but not limited thereto). The second threaded rod 710 is received at a fixed angle (e.g., 45 degrees) by a first single angled coupling 400A. A third threaded rod 720 extends downward from the first single angled coupling 400A to, for example, be secured to a connection point in a support member. A fourth threaded rod 730 extends from the dual angled coupling 600A at a fixed angle (preferably 45 degrees but not limited thereto). The fourth threaded rod 730 is received at a fixed angle (e.g., 45 degrees) by a second single angled coupling 400B. A fifth threaded rod 740 extends downward from the second single angled coupling 400B to, for example, be secured to a connection point in a support member.

It should be noted that the third threaded rod 720 and the fifth threaded rod 740 could be used to secure the same support member or different support members. It should be noted that the second single angled coupling 400B is utilized in opposite manner of the first single angled coupling 400A (e.g., rotated around vertical axis so that it receives angled threaded rod at upper left as opposed to upper right).

FIG. 7B illustrates the same dual angled coupling 600A and the two single angled couplings 400A, 400B being utilized to provide additional threaded rods a certain distance away in each direction from the threaded rod secured to mounted support in the ceiling. This type of implementation may be utilized when, for example, a mounted support may not be practical or possible to mount in the ceiling above an additional connection point in a support member. In this embodiment, the first threaded rod 700 passes through the dual angled coupling 600A so that it can be secured to a first connection point (not illustrated) and the third threaded rod 720 can be secured to a second connection point (not illustrated) and the fifth threaded rod 740 can be secured to a third connection point (not illustrated). It should be noted that the first, third and fifth threaded rods 700, 720, 740 could be used to secure the same support member or different support members.

FIG. 7C illustrates two single angled couplings 400C, 400D and a dual angled coupling 600B being utilized to provide a seismic restraint system to reduce or eliminate sway in a support member or the object (e.g., pipe) being supported therein. A first threaded rod 750 extends downward from a first mounted support (not illustrated) in a ceiling (not illustrated) in order to secure to a connection point (not illustrated) in a support member (not illustrated) as would typically be the case. However, the first threaded rod 750 passes through a dual angled coupling 600B. A second threaded rod 760 extends downward from a second mounted support (not illustrated) in the ceiling a certain distance away from the first mounted support (to the left as illustrated). The second rod 760 is received by a first single angled coupling 400C. A third threaded rod 770 extends from the first single angled coupling 400C at a fixed angle (preferably 45 degrees but not limited thereto). The third threaded rod 770 is received at a fixed angle (e.g., 45 degrees) by the dual angled coupling 600B. A fourth threaded rod 780 extends downward from a third mounted support (not illustrated) in the ceiling a certain distance away from the first mounted support (to the right as illustrated). The fourth rod 860 is received by a second single angled coupling 400D. A fifth threaded rod 790 extends from the second single angled coupling 400D at a fixed angle (preferably 45 degrees but not limited thereto). The fifth threaded rod 790 is received at a fixed angle (e.g., 45 degrees) by the dual angled coupling 600B.

The third and fifth threaded rods 770, 790 provide the sway support for the support member. It should be noted that the second single angled coupling 400D is utilized in opposite manner of the first single angled coupling 400C (e.g., rotated around vertical axis so that it provides angled threaded rod from lower left as opposed to lower right).

FIGS. 8A-C illustrate several views of an example dual angled coupling 800 that could be used to angle the threaded rod in two different directions. The angled coupling 800 includes a first internally threaded receptacle (coupler) 810, a second internally threaded receptacle (coupler) 820 that is rotated at a 45-degree angle 825 from the first coupler 810 and a third internally threaded receptacle (coupler) 830 that is also rotated at a 45-degree angle 835 from the first coupler 810 but in a different direction than the second coupler 820. The second coupler 820 and the third coupler 830 are separated by a 180-degree angle 815 on the axis of the first coupler 810. The angle 815 can best be seen in the simplified top view of FIG. 8C. A first threaded rod 860 is received at the top of the angled coupling 800, a second threaded rod 870 extends from a front side thereof at the angle 825 (the angle cannot be seen) and a third threaded rod 880 extends from a back side thereof at the angle 835 (the angle cannot be seen).

The angles 825, 835 are not limited to 45 degrees, but rather could be other standard angles that may be used in the field (e.g., 30 degrees, 60 degrees). The angles 825, 835 may be the same or may be different. According to one embodiment, the first coupler 810 may be a passthrough coupler where an interior is open from a first side to a second side so that the first threaded rod 860 can pass therethrough or a different threaded rod may be received from each side thereof. According to one embodiment, the second end (bottom as illustrated) of the first coupler 810 may be closed so that the first threaded rod 860 cannot pass therethrough but is simply secured therein. According to one embodiment, in order to provide additional support, a first support bracket 840 may be used between the first coupler 810 and the second coupler 820 and a second support bracket 850 may be used between the first coupler 810 and the third coupler 830.

According to one embodiment, the angled coupling 800 is made from a high strength material. The materials utilized may include for example, steel, cast iron, composites, high strength plastics, or combinations thereof.

According to one embodiment, the angled coupling 800 may be manufactured (e.g., machined, extruded) with the second and third couplers 820, 830 extending at the desired angles 825, 835 from the first coupler 810 and the desired angle 815 from each other. According to one embodiment, the angled coupling 800 may be formed by, for example, welding the second and third couplers 820, 830 to the first coupler 810. In order to weld the second and third couplers 820, 830 to the first coupler 810 the second and third couplers 820, 830 may be cut at the defined angles 825, 835. According to one embodiment, the angled coupling 800 may be manufactured with the support brackets 840, 850. According to one embodiment, the support bracket brackets 840, 850 may be manufactured separate and may be added to the angled coupling 800 by, for example, welding.

The openings and the thread pattern of each of the couplers 810, 820, 830 may be the same or may be different. According to one embodiment, at least one of the couplers 810, 820, 830 may include a plurality of opening diameters with the largest opening located closest to the exterior. Larger threaded rod could secure to the threads of the outer opening diameter while smaller threaded rod could pass through the outer opening diameter and be secured to the threads of the inner opening diameter. According to one embodiment, one or more inserts could be utilized to provide different sized diameters.

FIGS. 9A-D illustrate several views of an example quad angled coupling 900 that could be used to angle the threaded rod in four different directions. The angled coupling 900 includes a first internally threaded receptacle (coupler) 910 and second-fifth internally threaded receptacles (couplers) 920, 930, 940, 950 that are each rotated at a 45-degree angle from the first coupler 910 but in different directions. Each of the second-fifth couplers 920, 930, 940, 950 are separated by 90-degrees from each other around the axis of the first coupler 910. The 90-degree angles can best be seen in the simplified top view of FIG. 9D. A first threaded rod 960 is received at the top of the quad angled coupling 900, a second threaded rod 970 extends from a front side, a third threaded rod 975 extends from a right side, a fourth threaded rod 980 extends from a back side, and a fifth threaded rod 985 extends from a left side.

The angles that the second-fifth couplers 920, 930, 940, 950 extend from the axis of the first coupler 910 are not limited to 45 degrees, but rather could be other standard angles that may be used in the field (e.g., 30 degrees, 60 degrees). The angles may be the same or may be different. The angles that separate each of the second-fifth couplers 920, 930, 940, 950 around the axis of the first coupler 910 are not limited to 90 degrees.

According to one embodiment, the first coupler 910 may be a passthrough coupler where an interior is open from a first side to a second side so that the first threaded rod 960 can pass therethrough or a different threaded rod may be received from each side thereof. According to one embodiment, the second end (bottom as illustrated) of the first coupler 910 may be closed so that the first threaded rod 960 cannot pass therethrough but is simply secured therein. According to one embodiment, in order to provide additional support, support brackets 925, 935, 945, 955 may be used between the first coupler 810 and respective ones of the second-fifth couplers 920, 930, 940, 950.

According to one embodiment, the quad angled coupling 900 is made from a high strength material. The materials utilized may include for example, steel, cast iron, composites, high strength plastics, or combinations thereof.

According to one embodiment, the angled coupling 900 may be manufactured (e.g., machined, extruded) with the second-fifth couplers 920, 930, 940, 950 extending at the desired angles from the first coupler 910 and the desired angle therebetween each other. According to one embodiment, the angled coupling 900 may be formed by, for example, welding the second-fifth couplers 920, 930, 940, 950 to the first coupler 910. According to one embodiment, the angled coupling 900 may be manufactured with the support brackets 925, 935, 945, 955. According to one embodiment, the support bracket brackets 925, 935, 945, 955 may be manufactured separate and may be added to the angled coupling 900 by, for example, welding.

The openings and the thread pattern of each of the couplers 910-950 may be the same or may be different. According to one embodiment, at least one of the couplers 910-950 may include a plurality of opening diameters for securing different sized threaded rod. The largest opening may be located closest to the exterior where larger threaded rod could secure thereto. Smaller threaded rod may pass through the outer opening diameter and be secured to the threads of the inner opening diameter. According to one embodiment, one or more inserts could be utilized to provide different sized diameters.

The angled couplers described above have utilized threaded rod for connecting to other angled couplers, mounted supports and/or connection points in support members but are not limited thereto. Rather, threaded supports can be secured to the angled couplings so that other components could be used to provide the connections. For example, a threaded bolt could be used to secure a bracket (e.g., U-channel strut) to the angled coupling. By way of another example, a threaded eyelet could be secured to the angled coupling and a wire and/or cable support could be connected thereto.

Figure 10:
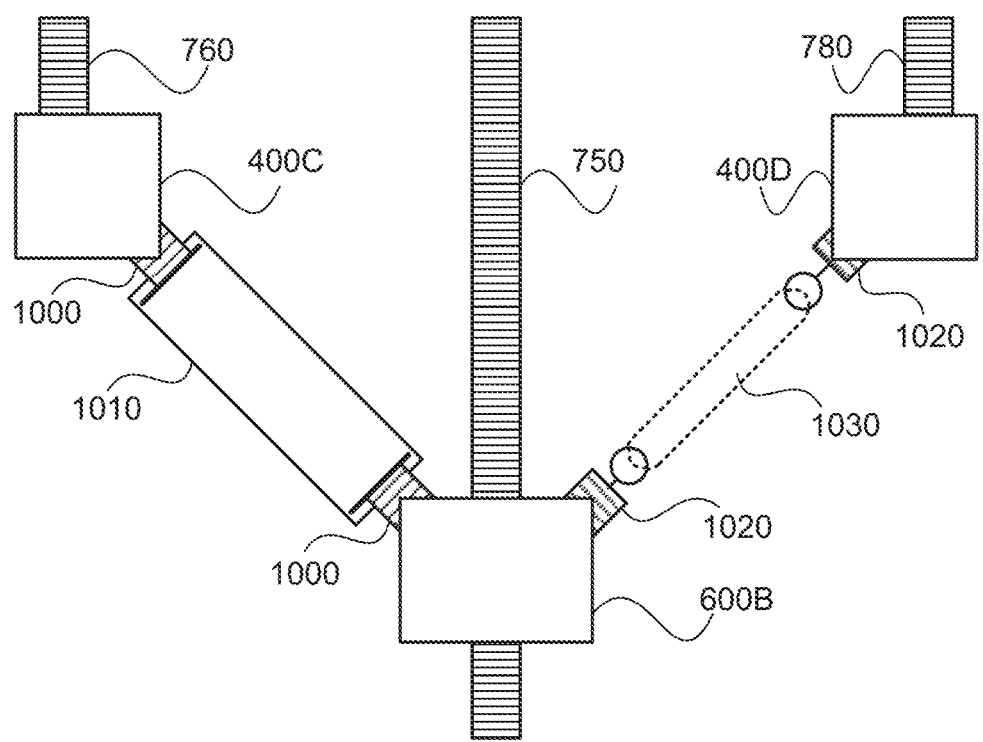
FIG. 10 illustrates the example implementation of FIG. 7C where certain threaded rods are replaced with other means of connection, according to one embodiment.

FIG. 10 illustrates the example implementation of FIG. 7C where the third and fifth threaded rods 770, 790 are replaced with other means of connection. The third thread rod 770 was replaced with threaded bolts 1000 and a bracket (e.g., U-channel strut) 1010. The bracket 1010 is secured to each of the angled couplings 400C, 600B with a threaded bolt 1000. The fifth thread rod 790 was replaced with threaded eyelets 1020 and a wire/cable 1030. The wire/cable 1030 is secured to each of the angled couplings 400C, 600B with a threaded eyelet 1020.

FIGS. 11A-C illustrate several views of an example angled coupling 1100 that enables a first threaded rod to pass therethrough and a second threaded rod to be connected thereto at an angle. The angled coupling 1100 includes a first coupling 1110 that is a pass through coupling and a second coupling 1120 that is rotated at a certain angle 1130 from the first coupling 1110. The second coupling 1200 includes a hole 1140 formed in alignment with the first coupling 1110. The hole 1140 enables a threaded rod to pass through the entire first coupling 1110 as indicated by the arrow. The coupling 1100 may include a support plate 1150 between the first and second couplings 1110, 1120.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily all referring to the same embodiment.

What is claimed:

1. An angled coupling for securing a plurality of threaded rods thereto at angles with respect to each other, the angled coupling comprising an internally threaded first coupler to threadedly receive a first threaded rod; and an internally threaded second coupler to threadedly receive a second threaded rod, wherein the second coupler is connected to the first coupler and extends from the first coupler at a defined angle from an axis of the first coupler;

wherein the first coupler is a passthrough coupler having an open threaded interior from a first end to a second end, the second coupler including a hole formed in alignment with the first coupler that enables a threaded rod to pass through the entire first coupler.

2. The angled coupling of claim 1, wherein the defined angle is 45-degrees.

3. The angled coupling of claim 1, wherein the first threaded rod is to be threadedly traverse through the first coupler.

4. The angled coupling of claim 1, wherein the first threaded rod is to be threadedly received in the first end of the first coupler and a third threaded rod is to be threadedly received in the second end of the first coupler.

5. The angled coupling of claim 1, wherein thread configurations and diameters of the first coupler and the second coupler are the same.

6. The angled coupling of claim 1, wherein at least one of the thread configurations and diameters of the first coupler and the second coupler are different.

7. The angled coupling of claim 1, further comprising a support plate located between edges of the first coupler and the second coupler.

8. The angled coupling of claim 1, wherein one or more of the angled couplings are used to shift threaded rod in a desired direction.

9. The angled coupling of claim 1, wherein one or more of the angled couplings are used to provide seismic restraint.

10. The angled coupling of claim 1, wherein one or more of the angled couplings are used to provide storm-pipe surge restraint.

11. An angled coupling comprising an internally threaded passthrough coupler to threadedly receive a first threaded rod from a first end thereof;

an internally threaded of angled coupler to threadedly receive an additional threaded rods, wherein the angled couplers is connected to the passthrough coupler and extend from the passthrough coupler at a defined angle from an axis of the passthrough coupler;

the angled coupler including a hole formed in alignment with the passthrough coupler that enables a threaded rod to pass through the entire passthrough coupler from the first end to a second end; and a support plate located between edges of the passthrough coupler and each of the plurality of angled couplers.

12. The angled coupling of claim 11, wherein the passthrough coupler is to either have the first threaded rod threadedly traverse from a first end to a second end of the passthrough coupler or to threadedly receive the first threaded rod in the first end and a second threaded rod in the second end.

13. The angled coupling of claim 11, wherein thread configurations and diameters of the passthrough coupler and the angled coupler are same.

14. The angled coupling of claim 11, wherein at least one of thread configurations and diameters of the passthrough coupler and the angled coupler are different.

* * * * *